(12) United States Patent
Christof

(10) Patent No.: US 7,487,939 B1
(45) Date of Patent: Feb. 10, 2009

(54) AIRCRAFT WITH EMERGENCY LANDING SYSTEM

(75) Inventor: Horst Christof, Aying (DE)

(73) Assignee: EADS Deutschland GmbH, Ottobrunn (DE)

( * ) Notice: Subject to any disclaimer, the term of this patent is extended or adjusted under 35 U.S.C. 154(b) by 377 days.

(21) Appl. No.: 11/493,567

(22) Filed: Jul. 27, 2006

(30) Foreign Application Priority Data

Jul. 29, 2005 (DE) .................. 10 2005 035 437

(51) Int. Cl.
B64D 17/80 (2006.01)
B64D 25/00 (2006.01)

(52) U.S. Cl. ........................ 244/139; 244/902

(58) Field of Classification Search ............ 244/139, 244/147, 149, 900, 901, 902
See application file for complete search history.

(56) References Cited

U.S. PATENT DOCUMENTS 2,631,797 A 3/1953 Smith
3,301,511 A * 1/1967 Webb .................. 244/138 R
3,747,877 A * 7/1973 Drew ..................... 244/139
3,796,398 A * 3/1974 Eilertson ................. 244/139
6,220,547 B1 * 4/2001 Smith et al. ............. 244/147

FOREIGN PATENT DOCUMENTS

| DE | 25 03 322 | 7/1976 |
| DE | 4208839 A1 | 9/1993 |
| DE | 42 39 638 A1 | 5/1994 |
| DE | 199 34 210 A1 | 2/2001 |
| FR | 603599 | 4/1926 |
| GB | 663075 | 12/1951 |
| SE | 206957 | 8/1996 |
| WO | 01/74659 A1 | 10/2001 |

OTHER PUBLICATIONS

European search report dated Oct. 18, 2007.

* cited by examiner

*Primary Examiner*—Rob Swiatek
(74) *Attorney, Agent, or Firm*—Crowell & Moring LLP

(57) ABSTRACT

An aircraft has an emergency landing system which includes a paraglider for the emergency landing phase of the aircraft and an attitude positioning parachute for decelerating and subsequently swiveling the aircraft with respect to the flight direction. The vertical axis essentially corresponds to the direction of pull from the attitude positioning parachute.

16 Claims, 7 Drawing Sheets

AIRCRAFT WITH EMERGENCY LANDING SYSTEM

This application claims the priority of German application 10 2005 035 437.8, filed Jul. 29, 2005, the disclosure of which is expressly incorporated by reference herein.

BACKGROUND AND SUMMARY OF THE INVENTION

This invention relates to an aircraft with an emergency landing system, having a longitudinal axis running through the center of gravity and a vertical axis essentially perpendicular thereto, which can be activated by a start signal from a trigger unit actuatable by operating parameters of the aircraft. The emergency landing system includes a paraglider for the emergency landing phase of the aircraft, and the trigger unit is adjusted so that a drag or a brake and attitude positioning parachute which is attached to the aircraft is ejected when the start signal appears.

An aircraft having the above-described combination of features represents prior art developed by the applicant, publication of which is not known. It is, however, generally known from the prior art to pull an emergency parachute from its storage position to an operating position by use of a small drag parachute.

An aircraft having an emergency landing system is known from German document DE 42 39 638 A1. The emergency landing system can be activated by a start signal triggered by operating parameters of the aircraft, and includes a drag parachute, attached to the aircraft by drag lines, for reducing the speed. The drag parachute, at the same time, also causes the aircraft to assume an oblique position which inclines the tail of the aircraft downward. In this flight phase, a second parachute for the emergency landing is automatically opened. During the subsequent hard landing, the tail of the aircraft is deformed, whereas the dimensionally rigid cabin remains essentially unchanged.

German documents DE 199 34 210 A1 and DE 25 03 322 A1 describe emergency landing systems for aircraft in which paragliders or parafoils are provided for emergency landing phases. In each case, the flight position of the aircraft in the emergency landing phase undergoes little or no change compared to the normal flight phase.

One object of the present invention is to enable an aircraft, operating at flight speeds in the range of 200 m/sec and higher, to land safely, i.e., without damage, by use of a paraglider, specifically in the case of an emergency situation such as engine failure. One aim is to minimize the structural complexity of such an emergency landing system, and to provide a system which guarantees high reliability. A further aim is to ensure that the installation space necessary for the emergency landing system, which is not insignificant because of the paraglider required for the emergency landing phase, is kept as small as possible, since the installation space in aircraft for which such an emergency landing system is considered, principally unmanned military aircraft, is very limited. Lastly, consideration should be made for the fact that the aircraft to be landed typically has a high speed, in the range of over 200 m/sec, when an emergency such as engine failure occurs. The aircraft therefore must be decelerated from a cruise motion to a descent motion before the paraglider for the emergency landing phase can be folded out, since paragliders can be opened only below speeds in the range of 50 m/sec.

The above-referenced requirements are met by an aircraft according to the invention.

In one embodiment of the invention, a release unit, by way of extension lines, pulls out an attitude positioning parachute from a storage position into a braking position when the flight speed drops below a predetermined first threshold speed. A pair of first suspension lines for the attitude positioning parachute is mounted on the aircraft behind, relative to the longitudinal axis, the center of gravity thereof, and a pair of second suspension lines is attached in front of the center of gravity of the aircraft. A positioning device causes the braking force from the attitude positioning parachute acting on the first suspension lines to be partially transferred to the second suspension lines when the flight speed drops below a second threshold speed, and the aircraft swivels with respect to its direction of motion. An unfolding device for the paraglider unfolds the latter as soon as the aircraft swivels in such a way that the vertical axis essentially corresponds to the direction of pull from the attitude positioning parachute, and the speed of the aircraft drops below a predetermined maximum paraglider speed.

In another embodiment of the invention, a brake and attitude positioning parachute is attached to the aircraft, and a pair of first suspension lines for a braking and attitude positioning parachute is mounted on the aircraft behind, relative to the longitudinal axis, the center of gravity thereof. A pair of second suspension lines is attached in front of the center of gravity of the aircraft. A positioning device causes the braking force from the braking and attitude positioning parachute acting on the first suspension lines to be partially transferred to the second suspension lines when the flight speed drops below a predetermined second threshold speed, and the aircraft swivels with respect to its direction of motion. An unfolding device for the paraglider unfolds the paraglider as soon as the aircraft swivels in such a way that the vertical axis essentially corresponds to the direction of pull from the braking and attitude positioning parachute, and the speed of the aircraft drops below a predetermined maximum paraglider speed.

One advantage of an aircraft having an emergency system as mentioned is that, to decelerate the aircraft from a high initial flight speed to a flight and descent speed that is suitable for a paraglider, besides the typically used auxiliary parachute (referred to here as "drag parachute"), only a brake parachute is necessary. The brake parachute decelerates the aircraft, and also causes the aircraft to swivel with respect to the direction of pull from this parachute as the result of appropriate attachment of the suspension lines, and is therefore referred to as an attitude positioning parachute. Thus, after an auxiliary parachute has reduced the initial flight speed and has pulled out the attitude positioning parachute from its storage position, in a first phase in the normal flight position of the aircraft, in which the direction of motion coincides with the longitudinal axis of the aircraft, the aircraft is decelerated by the attitude positioning parachute to a speed that permits the aircraft to swivel. In the second phase, appropriate control of the introduction of force to the aircraft by the attitude positioning parachute causes the aircraft to swivel in such a way that the vertical axis essentially corresponds to the direction of pull from the attitude positioning parachute, and the aircraft therefore goes into a descent. Only in a third phase is the paraglider pulled upward from the aircraft and used for a descent and a glide landing. A landing gear which may be present is extended, and in this manner a landing gear landing is achieved.

According to other claimed subject matter, a separate drag parachute is omitted. The attitude positioning parachute is used for both deceleration and attitude positioning, for which reason this parachute is referred to below as a brake and attitude positioning parachute. In one advantageous embodiment, in a first phase after ejection, the brake and attitude positioning parachute is only partially unfolded; i.e., it has a smaller diameter compared to the fully unfolded state. Only when a predetermined threshold speed is reached is the brake and attitude positioning parachute fully unfolded, by means of a release device such as a pyrotechnic cutter, for example. After further deceleration, the aircraft ultimately swivels.

In one preferred embodiment of the invention, which meets the requirement for structural simplicity, the positioning device for the attitude positioning parachute or for the brake and attitude positioning parachute is designed to include a clamping device in which the first suspension lines may be fixed in position on a portion of its total length. The entire length of the first suspension lines may be released after the speed drops below the second threshold speed, and the length of the second suspension lines is coordinated so that release of the clamping device causes tensile force from the attitude positioning parachute to be applied to the second suspension lines. This design incorporates not only structural simplicity, an extremely small space requirement, and low cost, but also maximum operational safety.

It is also possible to transfer the braking force of the attitude positioning parachute or the brake and attitude positioning parachute from the first pair of suspension lines to the second pair of suspension lines for swiveling the aircraft in a stepwise manner in order to maintain the most stable aircraft flow conditions possible. Starting from a relatively high speed upon initial swiveling of the aircraft, only a slight degree of swivel is initiated which corresponds to the typical aircraft stabilizer settings. Only after further deceleration is the swiveling then increased by steps until the vertical axis of the aircraft essentially corresponds to the direction of pull from the attitude positioning parachute.

Lastly, in a further embodiment of the invention, it is advantageous to also design the release device for pulling out the attitude positioning parachute from its storage position into a braking position by use of a clamping device for the suspension lines to which the extension lines are attached. The length of the extension lines is coordinated with a clamping length of the suspension lines such that, when the clamping device is opened, braking tension from the drag parachute is transferred from the suspension lines to the extension lines, thereby unfolding the attitude positioning parachute.

Various embodiments of the invention are described with reference to the appended drawings.

DETAILED DESCRIPTION OF THE INVENTION

Figures 1A, 1B:
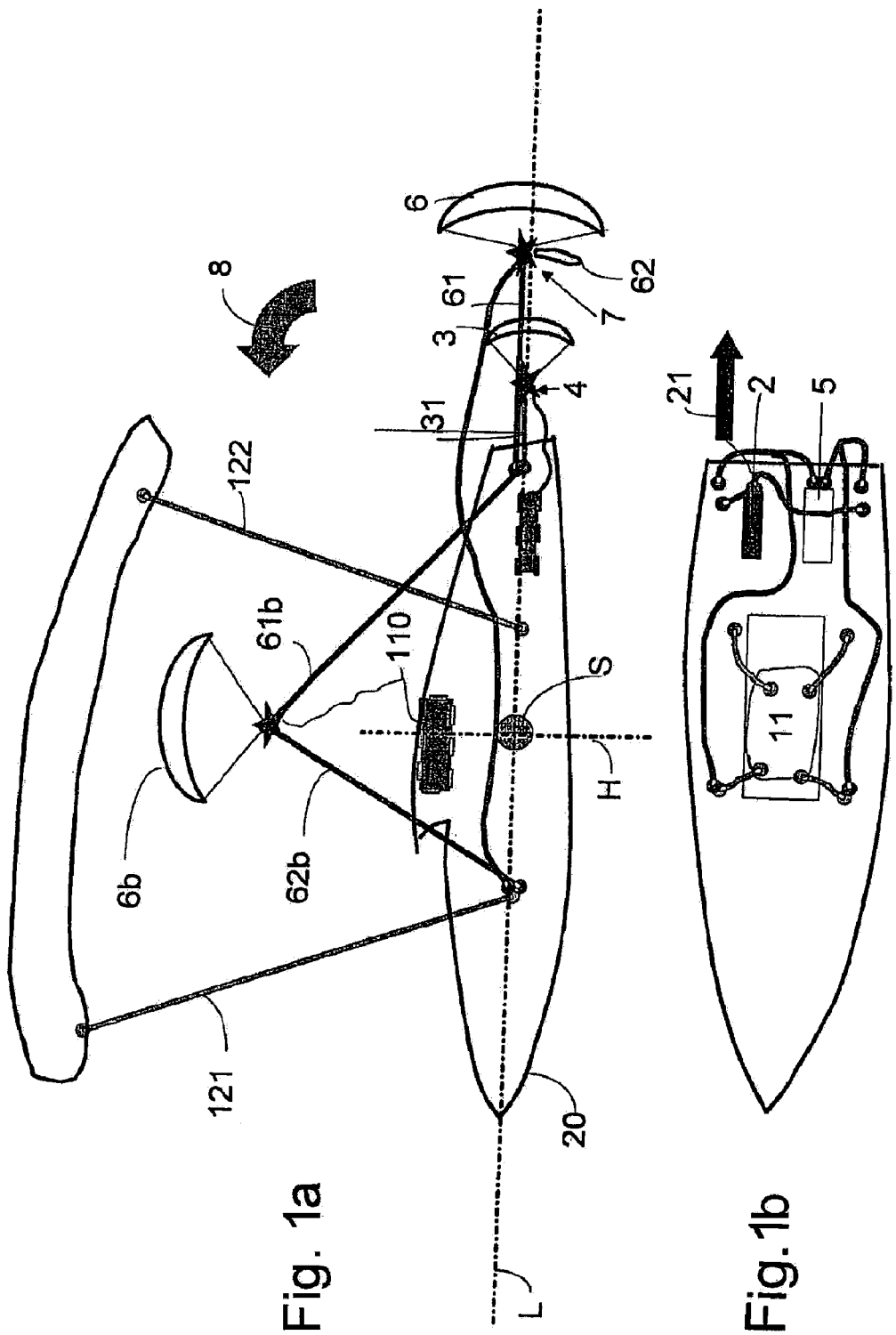
FIGS. 1a, 1b are is a schematic illustrations of an aircraft in the longitudinal section and in the top view together with the emergency landing system according to the invention, all essential elements being illustrated independently from the sequence of their actuation.
Figure 2:
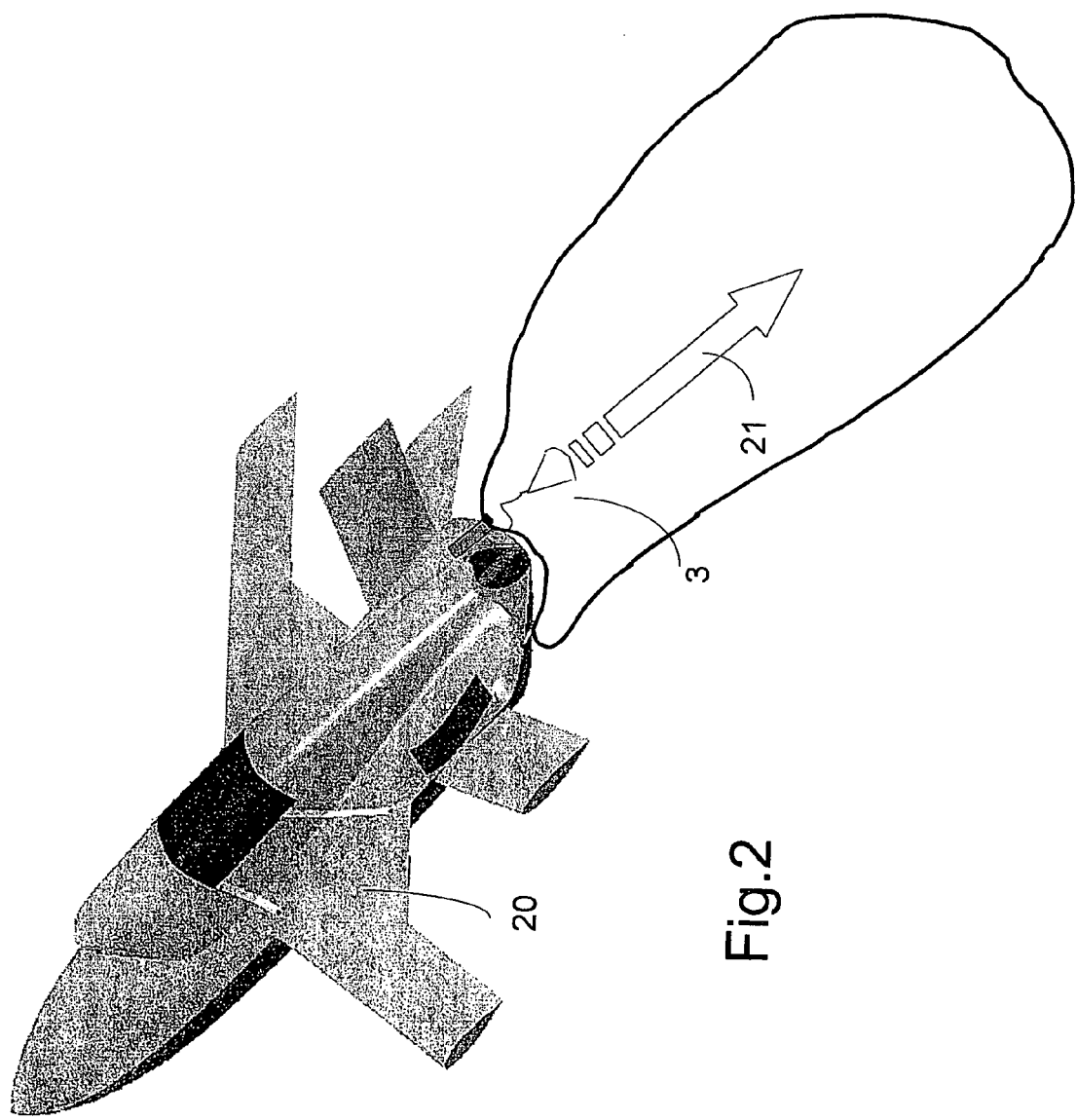
FIG. 2 shows the aircraft according to FIG. 1a, 1b in an oblique illustration, after the start signal for the emergency landing is triggered.

The aircraft 20, schematically illustrated in the longitudinal section and the top view in FIG. 1a, 1b, has a center of gravity S, a longitudinal axis L, and a vertical axis H. In its tail region, the aircraft has a storage container 2 for a drag parachute 3, which, after a start signal is triggered, is ejected in the direction of the arrow 21 by mechanical or pyrotechnic means and subsequently assumes the opened position shown in the longitudinal section, in which it decelerates the aircraft. A release unit 4 is provided in a suspension line 31 for the drag parachute 3, which by means of extension lines pulls out an attitude positioning parachute 6 from its storage position 5 (see the top view in FIG. 1b) into a braking position when the flight speed drops below a predetermined first threshold speed V1, as shown in the longitudinal section in FIG. 1a. Initially the braking force is transmitted to the aircraft 20 by a first pair of suspension lines 61 mounted on the aircraft 20 behind the center of gravity S thereof. A second pair of suspension lines 62 attached to the aircraft 20 in front of the center of gravity S in this phase is suspended in a slack state between the aircraft 20 and the attitude positioning parachute 6. This flight state is represented in the oblique illustration in FIG. 3, in which, depending on the actual conditions, the drag parachute 3 is located behind—relative to the flight direction of the aircraft 20—the attitude positioning parachute 6 which it has previously unfolded.

A rotary arrow 8 in FIG. 1a indicates the swivel motion of the aircraft 20 with respect to the attitude positioning parachute 6. After the swivel motion is completed, the attitude positioning parachute 6 assumes position 6b above the aircraft 20 in FIG. 1a, and both the first pair of suspension lines 61 and second pair of suspension lines 62 are under tension, as indicated by reference numerals 61b and 62b. As a result of the drag force from the attitude positioning parachute 6, the aircraft 20 then moves downward in the direction of the vertical axis.

Figure 4:
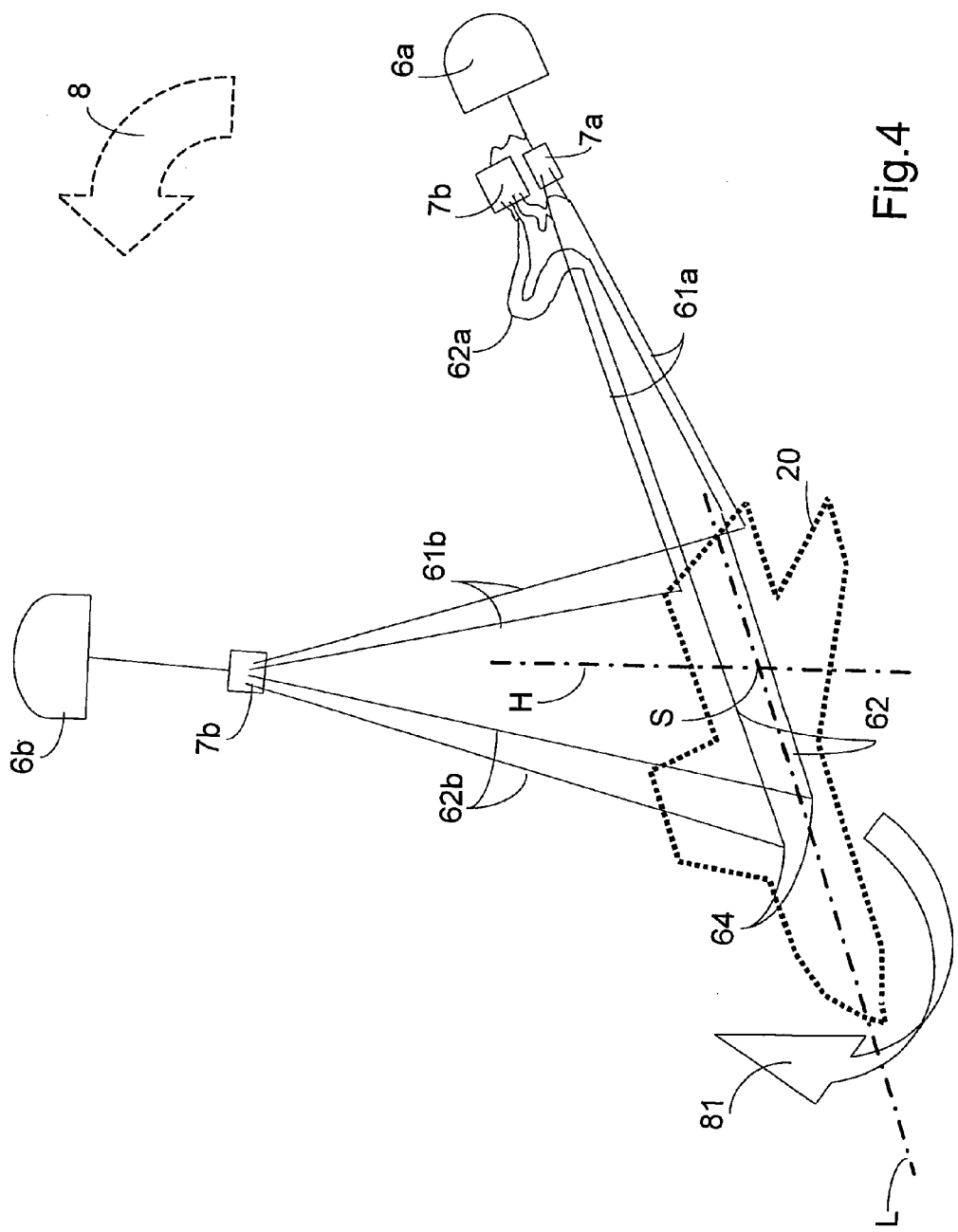
FIG. 4 shows the emergency landing phase following the phase according to FIG. 3, in which transmission of the braking force of the attitude positioning parachute from a first pair of suspension lines to a second pair of suspension lines causes the aircraft to swivel with respect to the direction of pull from the attitude positioning parachute.

The schematic illustration according to FIG. 4 once again shows the swivel process of the aircraft 20. The initial state before swiveling, i.e., the state in which the attitude positioning parachute 6 is suspended behind the aircraft 20 in the longitudinal direction L, in each case is designated by the index letter a, and the end state, in which the aircraft 20 is swiveled by approximately 90°, is designated by the index letter b on the reference numerals. Before swiveling, the full braking tension from the attitude positioning parachute 6 acts on the first pair of suspension lines 61 so that the first pair of suspension lines 61 is under tensile force, as indicated by 61a. The second pair of suspension lines, which is attached to the aircraft 20 in front of the center of gravity S (attachment points 64), is slack in this phase, as indicated by reference numeral 62a. When the flight speed drops below a second threshold speed V2, a positioning device 7 causes the braking force from the attitude positioning parachute 6 to be transferred to the second pair of suspension lines 62, whereby the position of the aircraft 20 changes with respect to the attitude positioning parachute 6 according to the rotational arrow 81 in FIG. 4, i.e., the position of the attitude positioning parachute changes from phase 6a to 6b. After the swivel motion is completed, the aircraft 20 is suspended by both pairs of suspension lines 61, 62, which are then under tension as indicated by index letter b in FIG. 4. The positioning device 7 is also illustrated in FIG. 4 in two sequences, namely, the initial phase 7a and the end phase 7b which is assumed after triggering as a result of the speed dropping below the second threshold speed V2. The positioning device 7 essentially comprises a clamping device in which the first pair of suspension lines 61 is initially fixed in position on a portion of its total length, and after the positioning device 7 is triggered the entire length of the first pair of suspension lines 61 is released. The length of the second pair of suspension lines 62 is coordinated so that release of the clamping device causes tensile force from the attitude positioning parachute 6 to be applied to the second pair of suspension lines. In this manner, a torque is exerted via the attachment points 64 to the aircraft 20 according to the arrow direction 81 in FIG. 4, which causes the aircraft 20 to swivel with respect to the attitude positioning parachute 6. The pair of suspension lines 61 may be released in a stepwise manner, which then results in a correspondingly stepwise swivel in the arrow direction 81.

Figure 5:
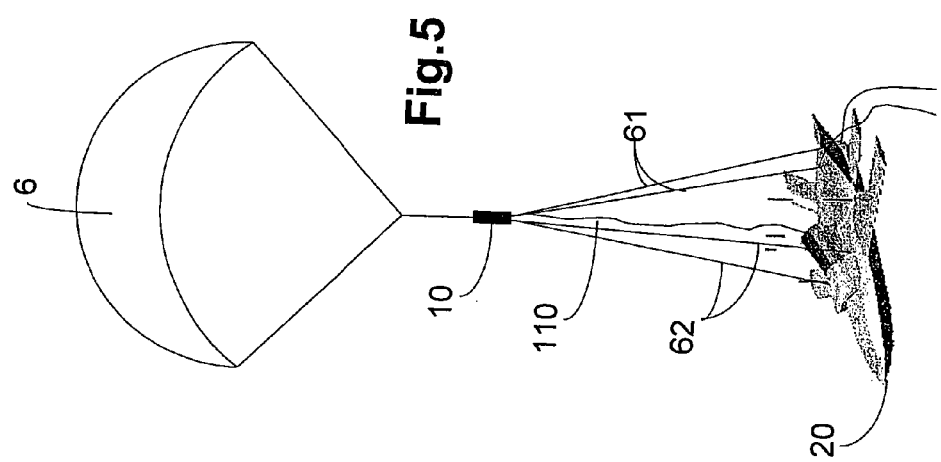
FIG. 5 shows the emergency landing phase following the phase shown in FIG. 4, in which the aircraft is suspended by the attitude positioning parachute during descent.

After the swivel phase is completed, which is simultaneously associated with a further decrease in the speed of the aircraft 20, the aircraft assumes the position shown in FIG. 5 in which the vertical axis H of the aircraft 20 essentially corresponds to the direction of pull from the attitude positioning parachute 6.

Figure 6:
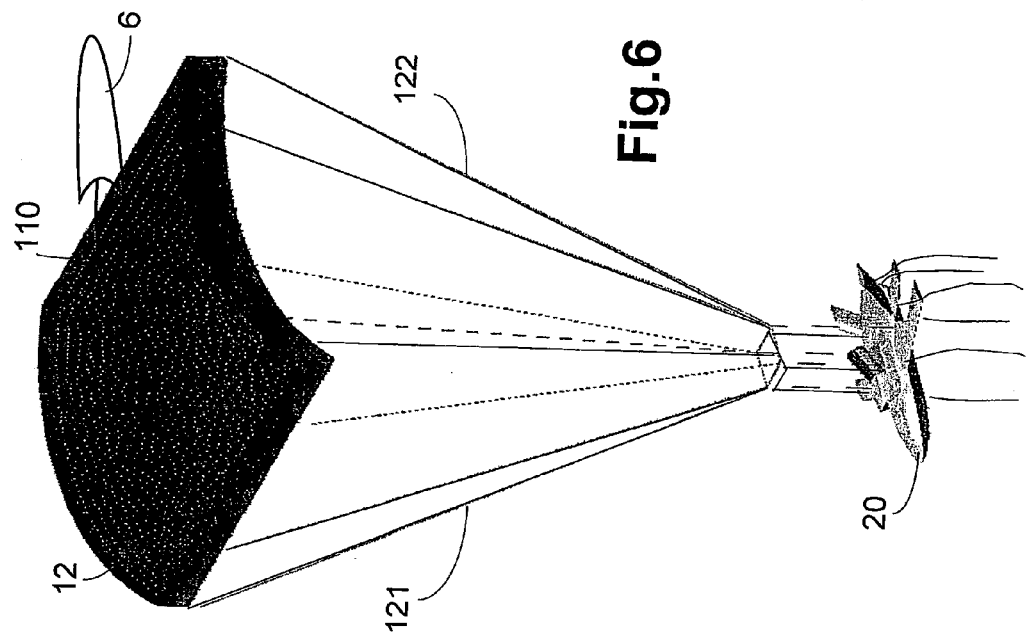
FIG. 6 shows the final emergency landing phase in which a paraglider bearing the aircraft is fully opened in order to gently land the aircraft on the ground.

By use of an unfolding device 10, when the speed of the aircraft 20 drops below a predetermined maximum allowable paraglider speed $V_3$, the paraglider 12 unfolds via an extension line 110. This final phase of the emergency landing system is also shown in FIG. 1a. The paraglider 12 is attached to the aircraft 20 by lines 121, 122, which are designed so as to enable control, known as such, of the paraglider 12. The paraglider flight of the aircraft 20 is shown once again in an oblique illustration in FIG. 6, which also indicates that the attitude positioning parachute 6 is no longer important in this flight phase.

Figure 7:
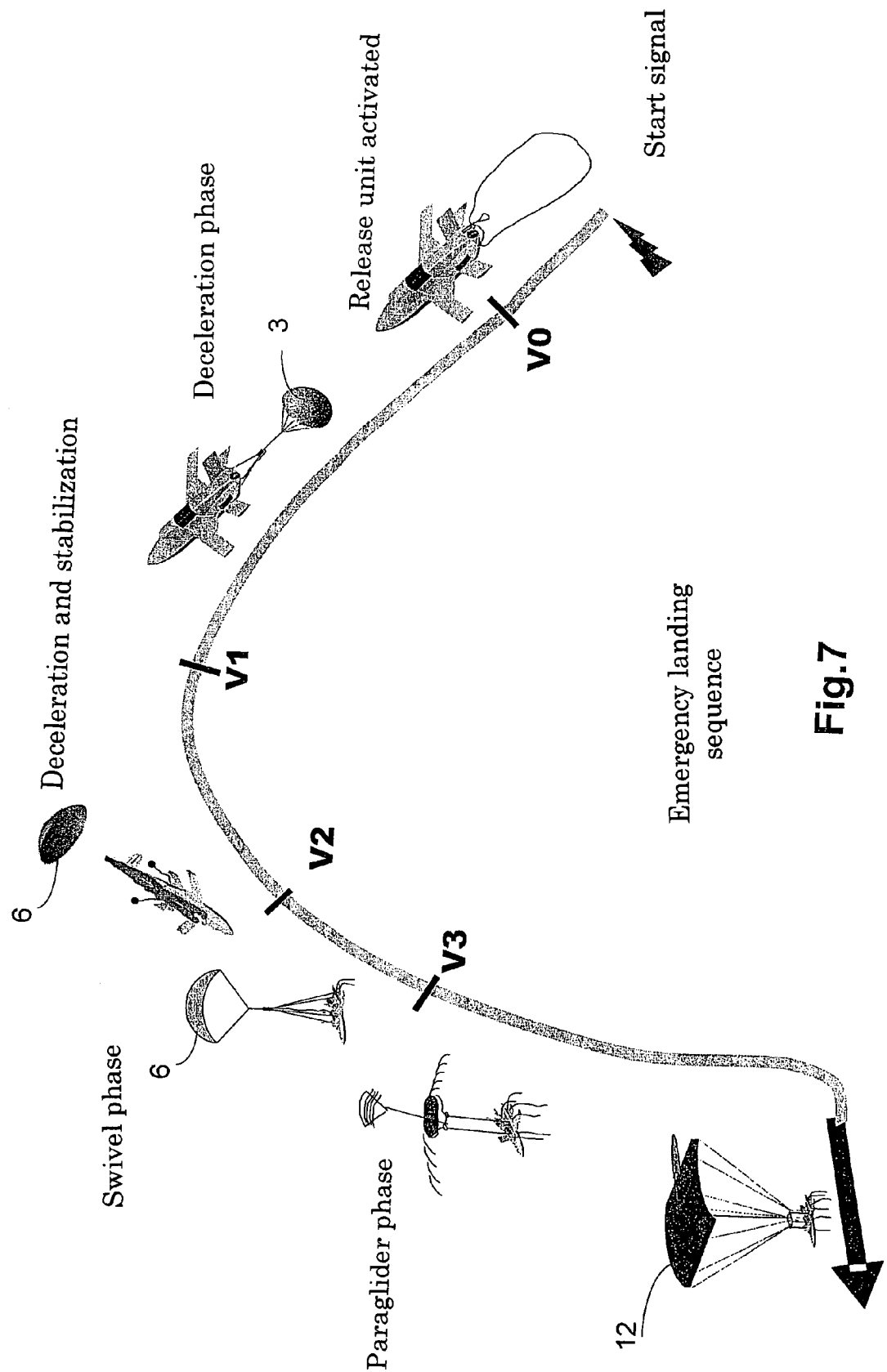
FIG. 7 schematically shows the sequence for the emergency landing.

The sequence of the emergency landing is schematically illustrated in FIG. 7, beginning with the aircraft cruise speed $V_0$ and the start signal on the right side of the figure, followed by activation of the trigger unit; the deceleration phase with the opened drag parachute 3 in which the speed is reduced from the original cruise speed $V_0$ to the threshold speed $V_1$, followed by the attitude positioning parachute 6 being pulled out when the threshold speed $V_1$ is reached, with the subsequent deceleration and stabilizing phase; the swivel phase which is initiated when the threshold speed $V_2$ is reached; and when the threshold speed $V_3$ is reached, folding out of the paraglider and the subsequent paraglider phase, with landing by the paraglider 12.

Figure 8:
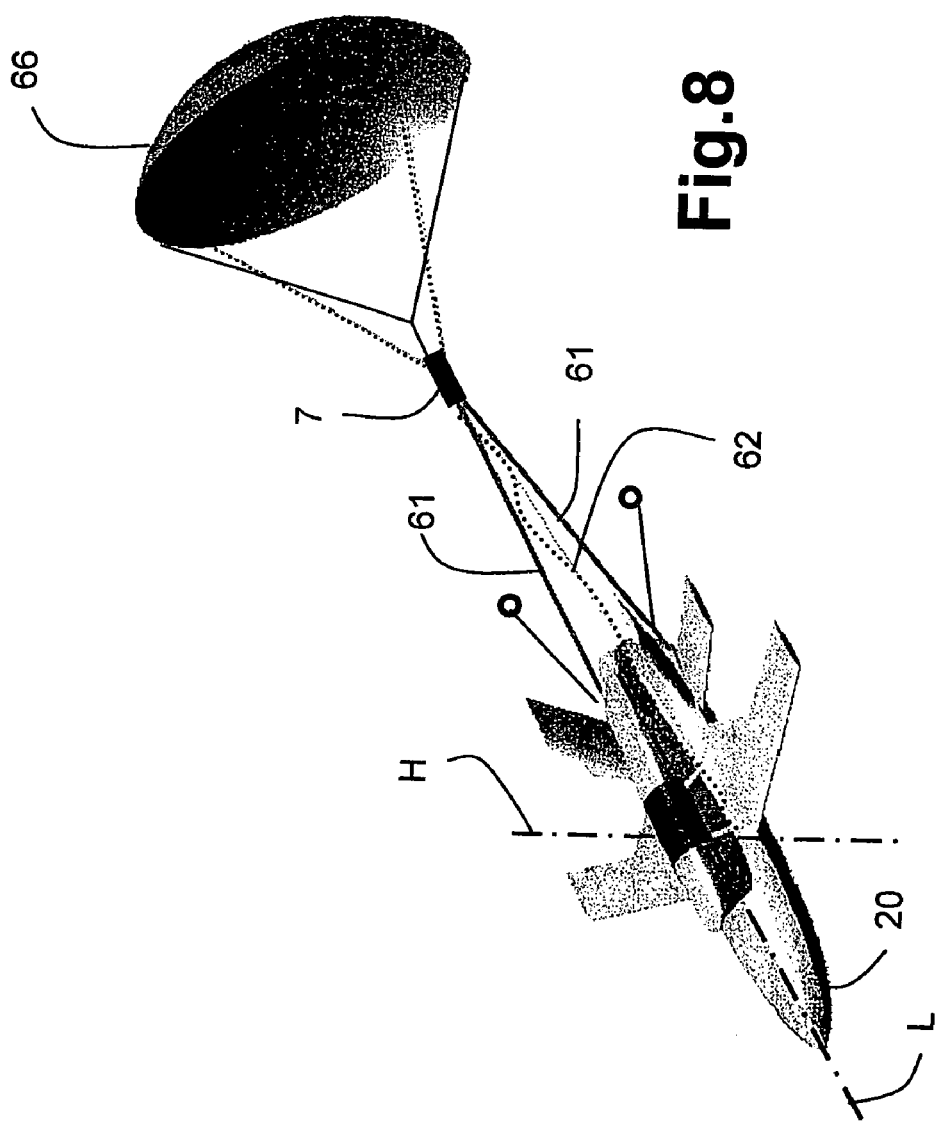
FIG. 8 shows an aircraft without a separate brake parachute, in a phase in which the brake and attitude positioning parachute has opened and exerts a braking tension in the longitudinal axis of the aircraft.

As previously mentioned, in one alternative embodiment, the use of a separate brake parachute (reference numeral 3 in FIG. 3) may be omitted. The braking function is then completely taken over by a parachute which also causes the aircraft to swivel. This parachute is referred to as a brake and attitude positioning parachute. Such an embodiment is illustrated in FIG. 8, specifically, in a flight phase in which the brake and attitude positioning parachute 66 is already fully opened and exerts braking tension in the longitudinal axis of the aircraft 20. The diameter of the brake and attitude positioning parachute may in particular be larger than the diameter of the attitude positioning parachute 6 in the embodiment according to FIG. 3.

Figure 3:
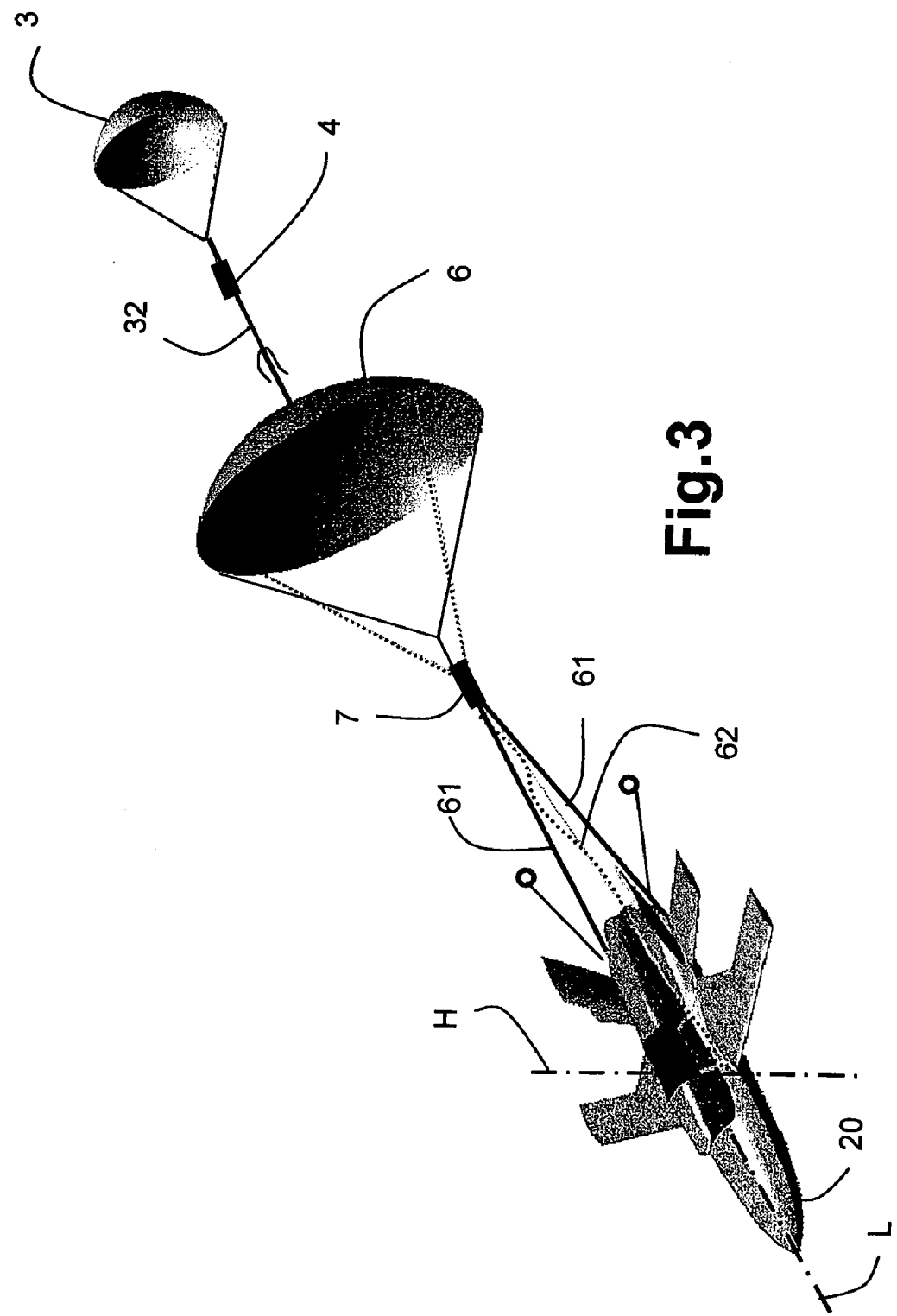
FIG. 3 shows the aircraft according to FIGS. 1 and 2 in an emergency landing phase following the start phase according to FIG. 2, in which the drag parachute has opened the attitude positioning parachute, which exerts a braking tension in the longitudinal axis of the aircraft.

The brake and attitude positioning parachute 66 is attached to the aircraft 20 in a manner similar to that explained for the attitude positioning parachute 6 according to FIG. 3. Reference is made to the explanations for FIG. 3. Both the swivel phase of the aircraft and the unfolding of the paraglider occur as described in FIGS. 4 through 6.

In one particularly advantageous embodiment, initially the brake and attitude positioning parachute is only partially unfolded after ejection. Thus, in this phase the brake and attitude positioning parachute is partially reefed. The parachute 66 is unreefed and thus fully unfolded only when a predetermined speed is reached which approximately corresponds to speed V1 in FIG. 7. In any case, this speed is less than the speed V2 at which the aircraft is swiveled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. An aircraft with an emergency landing system, having a longitudinal axis running through the center of gravity and a vertical axis essentially perpendicular thereto, comprising:
    a trigger unit, actuatable by operating parameters of the aircraft, providing a start signal to activate the emergency landing system,
    a paraglider for an emergency landing phase of the aircraft,
    a drag parachute which is attached to the aircraft, the trigger unit being adjusted so that the drag parachute is ejected when the start signal appears,
    a release unit which, by way of extension lines, pulls out an attitude positioning parachute from a storage position into a braking position when the flight speed drops below a predetermined first threshold speed,
    a pair of first suspension lines for the attitude positioning parachute mounted on the aircraft behind, relative to the longitudinal axis, the center of gravity thereof,
    a pair of second suspension lines attached in front of the center of gravity of the aircraft,
    a positioning device which causes the braking force from the attitude positioning parachute acting on the first suspension lines to be partially transferred to the second suspension lines when the flight speed drops below a second threshold speed, and the aircraft swivels with respect to its direction of motion, and
    an unfolding device for the paraglider which unfolds the latter as soon as the aircraft swivels in such a way that the vertical axis essentially corresponds to the direction of pull from the attitude positioning parachute, and the speed of the aircraft drops below a predetermined maximum paraglider speed.

2. The aircraft according to claim 1, wherein the positioning device for the attitude positioning parachute comprises a clamping device in which the first suspension lines may be fixed in position on a portion of its total length, wherein the entire length of the first suspension lines may be released after the speed drops below the second threshold speed, and wherein the length of the second suspension lines is coordinated so that release of the clamping device causes tensile force from the attitude positioning parachute to be applied to the second suspension lines.

3. The aircraft according to claim 2, wherein transfer of braking force from the first suspension lines to the second suspension lines occurs in a stepwise manner, and wherein each braking force transfer step is triggered according to a predetermined decrease in speed.

4. The aircraft according to claim 3, wherein the positioning device comprises a clamping device for the suspension lines to which the extension lines are attached, and wherein the length of the extension lines is coordinated with a clamping length of the suspension lines such that, when the clamping device is opened, braking tension from the drag parachute is transferred from the suspension lines to the extension lines, thereby unfolding the attitude positioning parachute.

5. The aircraft according to claim 2, wherein the positioning device comprises a clamping device for the suspension lines to which the extension lines are attached, and wherein the length of the extension lines is coordinated with a clamping length of the suspension lines such that, when the clamping device is opened, braking tension from the drag parachute is transferred from the suspension lines to the extension lines, thereby unfolding the attitude positioning parachute.

6. The aircraft according to claim 1, wherein transfer of braking force from the first suspension lines to the second suspension lines occurs in a stepwise manner, and wherein each braking force transfer step is triggered according to a predetermined decrease in speed.

7. The aircraft according to claim 6, wherein the positioning device comprises a clamping device for the suspension lines to which the extension lines are attached, and wherein the length of the extension lines is coordinated with a clamping length of the suspension lines such that, when the clamping device is opened, braking tension from the drag parachute is transferred from the suspension lines to the extension lines, thereby unfolding the attitude positioning parachute.

8. The aircraft according to claim 1, wherein the positioning device comprises a clamping device for the suspension lines to which the extension lines are attached, and wherein the length of the extension lines is coordinated with a clamping length of the suspension lines such that, when the clamping device is opened, braking tension from the drag parachute is transferred from the suspension lines to the extension lines, thereby unfolding the attitude positioning parachute.

9. The aircraft according to claim 1, wherein the release unit is integrated into the suspension lines.

10. An aircraft with an emergency landing system, having a longitudinal axis running through the center of gravity and a vertical axis essentially perpendicular thereto, comprising:
a trigger unit, actuatable by operating parameters of the aircraft, providing a start signal to activate the emergency landing system,
a paraglider for an emergency landing phase of the aircraft,
a brake and attitude positioning parachute which is attached to the aircraft, the trigger unit being adjusted so that the brake and attitude positioning parachute is ejected when the start signal appears,
a pair of first suspension lines for the braking and attitude positioning parachute which is mounted on the aircraft behind, relative to the longitudinal axis, the center of gravity thereof,
a pair of second suspension lines attached in front of the center of gravity of the aircraft,
a positioning device which causes the braking force from the braking and attitude positioning parachute acting on the first suspension lines to be partially transferred to the second suspension lines when the flight speed drops below a predetermined threshold speed, and the aircraft swivels with respect to its direction of motion, and
an unfolding device for the paraglider which unfolds the latter as soon as the aircraft swivels in such a way that the vertical axis essentially corresponds to the direction of pull from the braking and attitude positioning parachute, and the speed of the aircraft drops below a predetermined maximum paraglider speed.

11. The aircraft according to claim 10, wherein the positioning device for the braking and attitude positioning parachute comprises a clamping device in which the first suspension lines may be fixed in position on a portion of its total length, wherein the entire length of the first suspension lines may be released when the speed drops below the predetermined threshold speed, and wherein the length of the second suspension lines is coordinated so that release of the clamping device causes tensile force from the braking and attitude positioning parachute to be applied to the second suspension lines.

12. The aircraft according to claim 11, wherein transfer of braking force from the first suspension lines to the second suspension lines occurs in a stepwise manner, and wherein each braking force transfer step is triggered according to a predetermined decrease in speed.

13. The aircraft according to claim 11, wherein, initially, the brake and attitude positioning parachute is only partially unfolded after ejection, and wherein the brake and attitude positioning parachute has a release device by which the brake and attitude positioning parachute is fully unfolded when a further threshold speed is reached which is less than the threshold speed at which the aircraft is swiveled.

14. The aircraft according to claim 10, wherein transfer of braking force from the first suspension lines to the second suspension lines occurs in a stepwise manner, and wherein each braking force transfer step is triggered according to a predetermined decrease in speed.

15. The aircraft according to claim 14, wherein, initially, the brake and attitude positioning parachute is only partially unfolded after ejection, and wherein the brake and attitude positioning parachute has a release device by which the brake and attitude positioning parachute is fully unfolded when a further threshold speed is reached which is less than the threshold speed at which the aircraft is swiveled.

16. The aircraft according to claim 10, wherein, initially, the brake and attitude positioning parachute is only partially unfolded after ejection, and wherein the brake and attitude positioning parachute has a release device by which the brake and attitude positioning parachute is fully unfolded when a further threshold speed is reached which is less than the threshold speed at which the aircraft is swiveled.

* * * * *